(12) United States Patent
Mishra et al.

(10) Patent No.: US 10,293,691 B2
(45) Date of Patent: May 21, 2019

(54) METER ASSEMBLY

(71) Applicants: DENSO International America, Inc., Southfield, MI (US); DENSO CORPORATION, Kariya, Aichi-pref. (JP)

(72) Inventors: Ramesh Mishra, Troy, MI (US); Rajesh Keshavamurthy, South Lyon, MI (US); Amol Deshmukh, Canton, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/729,251

(22) Filed: Oct. 10, 2017

(65) Prior Publication Data

US 2019/0105988 A1    Apr. 11, 2019

(51) Int. Cl.
*B60Q 3/00* (2017.01)
*B60K 37/02* (2006.01)
*G01D 7/04* (2006.01)

(52) U.S. Cl.
CPC .............. *B60K 37/02* (2013.01); *G01D 7/04* (2013.01)

(58) Field of Classification Search
CPC .............. F21Y 2115/10; F21Y 2105/16; F21Y 2105/10; F21Y 2115/30; F21Y 2101/00; F21Y 2103/10; F21Y 2103/33; F21Y 2107/30; F21Y 2107/90; F21Y 2113/00; F21Y 2113/10; F21S 41/147; F21S 43/14; F21S 41/06

USPC ....... 340/438, 439, 441, 444, 449, 431–433, 340/457, 458, 464, 463, 468, 488, 478, 340/539.22, 545.3, 555, 657, 680, 688, 340/691.6, 825.36
See application file for complete search history.

(56) References Cited

U.S. PATENT DOCUMENTS

| | | | |
|---|---|---|---|
| 4,134,661 A * | 1/1979 | Ishizaka | G03B 17/20 396/296 |
| 6,508,562 B1 * | 1/2003 | Venkatram | G01D 11/28 116/286 |
| 2010/0103694 A1 * | 4/2010 | Saxena | G02B 6/0001 362/554 |
| 2014/0198515 A1 * | 7/2014 | Tulio | B60Q 1/24 362/516 |
| 2016/0076722 A1 * | 3/2016 | Hessling von Heimendahl | B64D 47/04 362/470 |
| 2016/0091653 A1 * | 3/2016 | Ban | G02B 6/0043 362/613 |
| 2017/0073083 A1 * | 3/2017 | Hessling-von Heimendahl | B64D 47/06 |
| 2017/0261173 A1 * | 9/2017 | Suzuki | B60Q 1/08 |
| 2018/0141677 A1 * | 5/2018 | Lapujade | B64D 45/08 |

* cited by examiner

*Primary Examiner* — Daniel Previl
(74) *Attorney, Agent, or Firm* — Harness, Dickey & Pierce, P.L.C.

(57) ABSTRACT

A meter assembly for a vehicle instrument panel. The meter assembly includes a reflector case having a plurality of light guides extending from an inner surface of the reflector case. Neighboring ones of the plurality of light guides have different lengths and extend different distances from the inner surface of the reflector case.

17 Claims, 3 Drawing Sheets

METER ASSEMBLY

FIELD

The present disclosure relates to a meter assembly for a vehicle, such as for a vehicle instrument panel.

BACKGROUND

This section provides background information related to the present disclosure, which is not necessarily prior art.

Vehicles typically include a meter assembly arranged at an instrument panel of the vehicle. The meter assembly displays information to a driver of the vehicle that is relevant to vehicle operation. For example, the meter assembly will typically include speed of the vehicle, engine speed, engine temperature, etc.

Meter assemblies typically include a plurality of plates coupled together. The plates often include a circuit board with light emitting elements, which illuminate indicators of a dial plate. Arranged between the dial plate and the circuit board is a reflector case including a plurality of light guides, which are often referred to as "chimneys." The light guides guide light from the light emitting elements to the indicators of the dial plate. Arranged between the reflector case and the circuit board is a main case, which includes a plurality of holes. Each one of the light guides is aligned with a different one of the holes of the main case. The light guides extend towards, but do not contact, the main case. Thus gaps are defined between the light guides in the main case. With current assemblies, all of the light guides have the same length. As a result, light passing through one of the holes of the main case may leak through the gaps into one or more light guides adjacent to the light guide aligned with the hole. Thus illumination of a single light emitting element of a circuit board may unintentionally result in illumination of more than one of the indicators of the dial plate, which can make it difficult to determine which one of the indicators was intended for illumination. The present teachings advantageously provide for a meter assembly that eliminates light leak from one light guide to another, and reduces tooling costs associated with forming the light guides. One skilled in the art will appreciate that the present teachings provide numerous additional advantages.

SUMMARY

This section provides a general summary of the disclosure, and is not a comprehensive disclosure of its full scope or all of its features.

The present teachings provide for a meter assembly for a vehicle instrument panel. The meter assembly includes a reflector case having a plurality of light guides extending from an inner surface of the reflector case. Neighboring ones of the plurality of light guides have different lengths and extend different distances from the inner surface of the reflector case.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
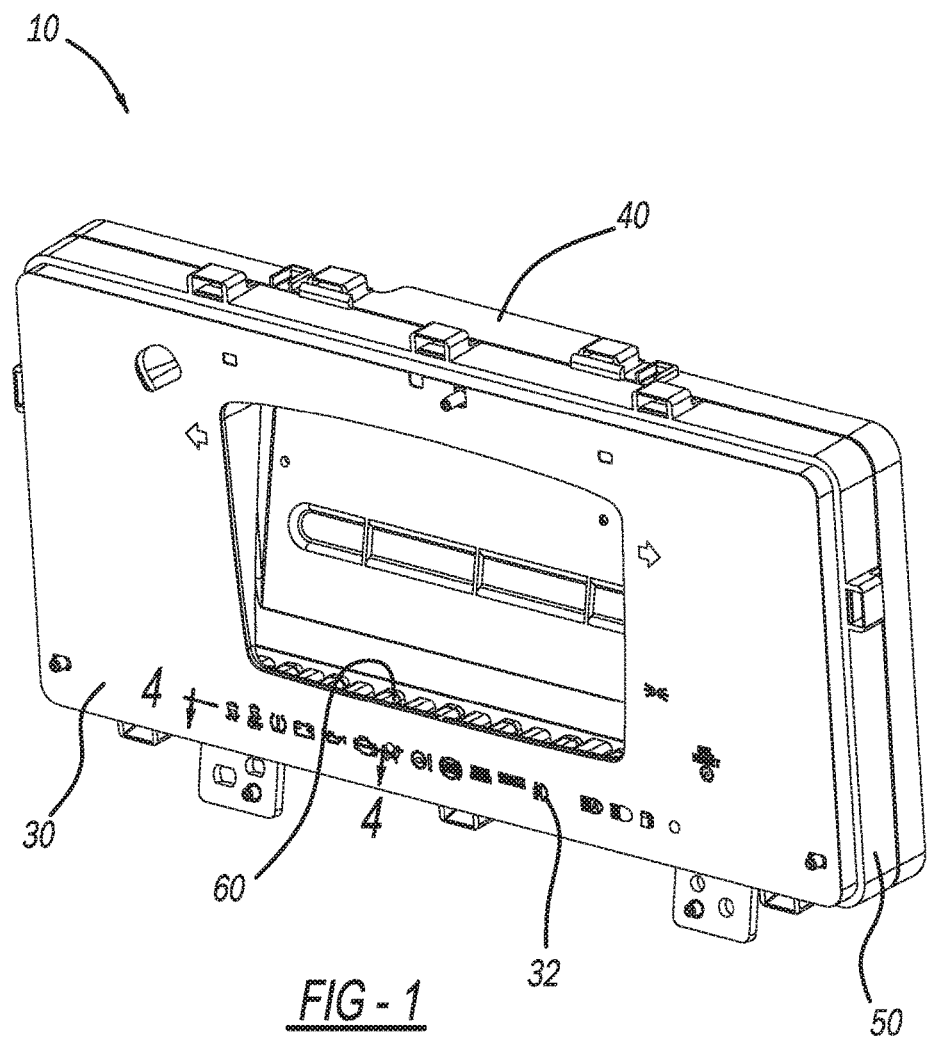
FIG. 1 illustrates a meter assembly in accordance with the present teachings.
Figure 2:
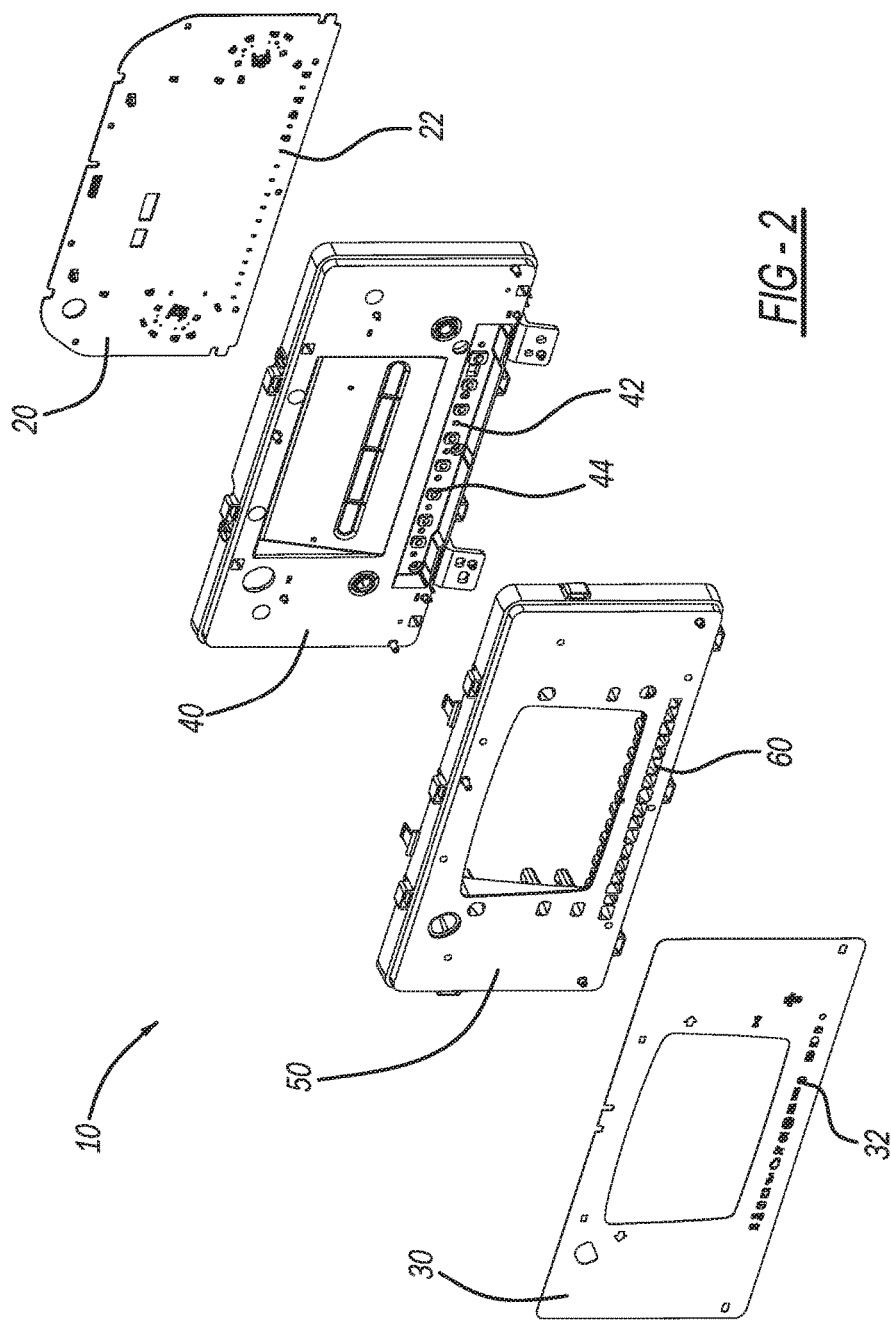
FIG. 2 is an exploded view of the meter assembly of FIG. 1.

With initial reference to FIGS. 1 and 2, a meter assembly in accordance with the present teachings is illustrated at reference numeral 10. The meter assembly 10 can be any suitable meter assembly, such as for an instrument panel of a vehicle. The meter assembly 10 can be configured for use with any vehicle, such as any suitable passenger vehicle, mass transit vehicle, motorcycle, construction equipment, military vehicle, watercraft, aircraft, all-terrain vehicle, snowmobile, etc.

The meter assembly 10 includes a plurality of plates coupled together. Any suitable number of plates can be included with the assembly 10. In the example illustrated, the meter assembly 10 includes a circuit board 20, a dial plate 30, a main case 40, and a reflector case 50.

The circuit board 20 includes a plurality of light emitting elements 22. Any suitable light emitting elements can be included, such as light emitting diodes (LEDs). The light emitting elements 22 selectively illuminate portions of the dial plate 30 corresponding to locations of indicators 32. Each one of the light emitting elements 22 is aligned with a different one of the indicators 32. The indicators 32 can be any appropriate graphics suitable for conveying information to the driver regarding the status of the vehicle and various features thereof. For example, the indicators 32 may inform the driver whether or not the vehicle's high beams are on, vehicle tire pressure is high, vehicle oil level is low, washer fluid is low, the engine requires service, etc.

The main case 40 defines a plurality of holes 42. The circuit board 20 is arranged at a rear side of the main case 40 such that each one of the light emitting elements 22 is aligned with a different one of the holes 42. The main case 40 further includes a plurality of base members 44 located at alternating ones of the holes 42. The base members 44 generally elongate the length of alternating ones of the holes 42.

Figure 3:
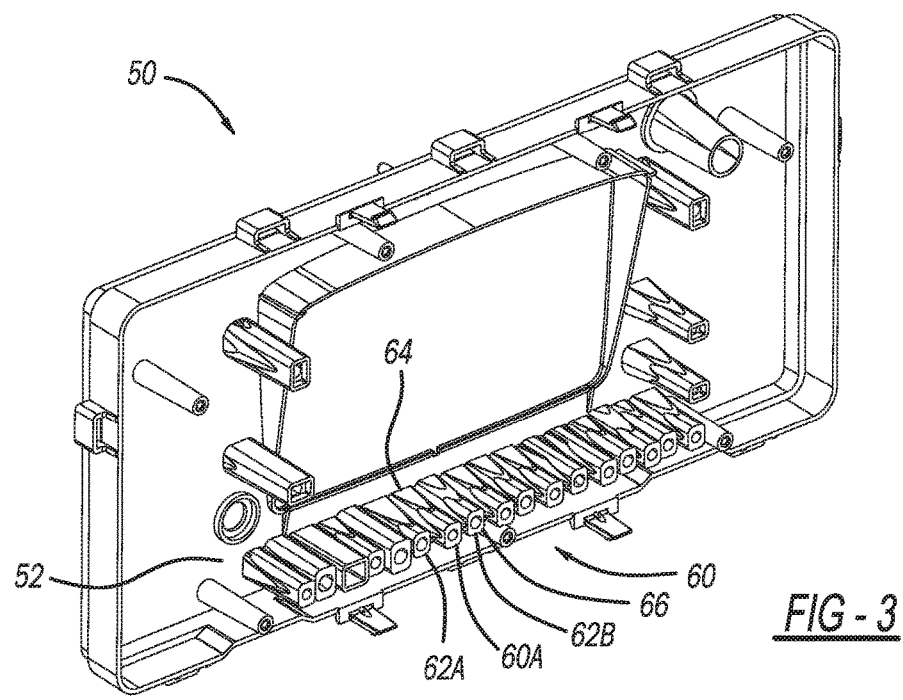
FIG. 3 is a perspective view of a reflector case of the meter assembly of FIG. 1.
Figure 4:
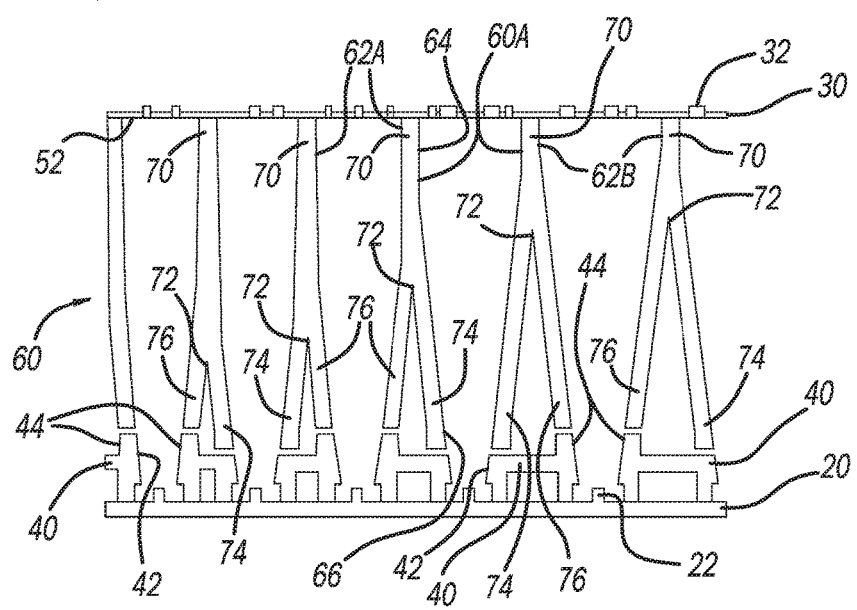
FIG. 4 is a cross-sectional view taken along line 4-4 of FIG. 1.

The reflector case 50 includes a plurality of light guides 60. With continued reference to FIGS. 1 and 2, and additional reference to FIGS. 3 and 4, the plurality of light guides 60 are configured such that neighboring ones of the plurality of light guide 60 have different lengths, and extend different distances from an inner surface 52 of the reflector case 50. For example, a first light guide 60A is longer than neighboring second light guides 62A and 62B.

Each one of the plurality of light guides 60 includes a first end 64 and a second end 66. The first end 64 is at the inner surface 52 of the reflector case 50, and the second end 66 is opposite to the first end 64. Each one of the light guides 60 further includes a reflective wall 70 (see FIG. 4). At the first end 64 the reflective wall 70 is shared by two adjacent light guides 60. Thus in the example of FIG. 4, the reflective wall 70 has a first reflective surface of the first light guide 60A, and a second reflective surface of the adjacent second light guides 62A and 62B.

Each reflective wall 70 extends from the first end 64 to a split point 72. At the split point 72 the reflective wall 70 splits into a first or long portion 74 and a second or short portion 76. The long portion 74 and the short portion 76 are spaced apart to define a gap therebetween. The long portion 74 extends further from the split point 72 than the short portion 76 does. The long portion 74 and the short portion 76 define different neighboring light guides 60. For example, long portion 74 defines a distal end of first light guide 60A, and short portion 76 defines a distal end of the second light guides 62A and 62B.

The plurality of light guides 60 are arranged such that each one of the short portions 76 extends towards, but not entirely to, the holes 42 of the main case 40 including the base members 44. Thus a gap is defined between the short portions 76 and the base members 44. Each one of the long portions 74 are arranged such that they extend towards, but not entirely to, the holes 42 that do not include the base members 44. Thus a gap is defined between the long portions 74 and the main case 40.

Because the long portions 74 and the short portions 76 have different lengths, and the base members 44 effectively provide the holes 42 with different lengths, any light from the light emitting elements 22 passing through gaps defined between the long and short portions 74 and 76 and the main case 40 will become trapped between the long and short portions 74 and 76. This advantageously prevents light from a light emitting element 22 from passing through the gaps between the long and short portions 74 and 76, and into an adjacent one of the light guides 60, which may undesirably illuminate one of the indicators 32 adjacent to the indicator 32 directly aligned with the illuminated light emitting element 22.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A meter assembly for a vehicle instrument panel, the meter assembly comprising:
   a reflector case including a plurality of light guides extending from an inner surface of the reflector case, neighboring ones of the plurality of light guides have different lengths and extend different distances from the inner surface of the reflector case;
   a circuit board including a plurality of light emitting elements, the circuit board is arranged such that the light emitting elements are aligned with different ones of the plurality of light guides; and
   a main case arranged between the circuit board and the reflector case, the main case defining a plurality of holes aligned with different ones of the light emitting elements, on a side of the main case facing the reflector case the main case includes base members at alternating openings of the plurality of holes;

wherein each one of the plurality of light guides includes a reflective wall, at a split point spaced apart from the inner surface the reflective wall splits into a first split portion and a second split portion of different lengths.

2. The meter assembly of claim 1, wherein each light guide includes a first end at the inner surface and a second end distal to the inner surface, the first end is wider than the second end.

3. The meter assembly of claim 1, wherein the first split portion defines a first one of the plurality of light guides, and the second split portion defines a second one of the plurality of light guides.

4. The meter assembly of claim 1, wherein the first and second split portions are spaced apart from one another to define a gap therebetween.

5. The meter assembly of claim 1, wherein the split points of neighboring ones of the plurality of light guides are spaced apart from the inner surface at different distances.

6. The meter assembly of claim 1, wherein at the inner surface neighboring ones of the plurality of light guides share opposite sides of the reflective wall, the first split portion defining a first one of the plurality of light guides and the second split portion defining a second one of the plurality of light guides, the first split portion is spaced apart from the second split portion to define a gap therebetween.

7. The meter assembly of claim 1, wherein the base members are arranged opposite to longer ones of the plurality of light guides, and not arranged opposite to shorter ones of the plurality of light guides.

8. The meter assembly of claim 7, wherein the first split portion is a long split portion and the second split portion is a short split portion, each of the short split portions extend towards one of the base members, and each of the long split portions extend towards areas between the base members.

9. The meter assembly of claim 8, wherein gaps are defined between the short split portions and the base members, and between the long split portions and the areas between the base members.

10. The meter assembly of claim 8, wherein the long spilt portions and the short split portions are spaced apart from the main case.

11. A meter assembly for a vehicle instrument panel, the meter assembly comprising:
- a circuit board including light emitting elements;
- a main case defining a plurality of holes, the circuit board is arranged at a rear side of the main case such that each one of the light emitting elements is aligned with a different one of the plurality of holes;
- a reflector case including a plurality of light guides extending from an inner surface of the reflector case, neighboring ones of the plurality of light guides have different lengths and extend different distances from the inner surface of the reflective case, the main case is arranged at a rear side of the reflector case such that each one of the plurality of holes of the main case is aligned with a different one of the plurality of light guides, the plurality of light guides extend towards the plurality of holes and gaps are defined between the plurality of the light guides and the plurality of holes; and
- a dial plate arranged over the light guides, the dial plate including a plurality of indicators illuminated by the light emitting elements;

wherein each one of the plurality of light guides includes a reflective wall, at a split point spaced apart from the inner surface the reflective wall splits into a first split portion and a second split portion of different lengths.

12. The meter assembly of claim 11, the main case further including base members arranged at alternating ones of the plurality of holes on a side of the main case facing the reflector case;

wherein the plurality of light guides are arranged such that shorter light guides extend to the holes at which the base members are positioned, and longer light guides extend to the holes that do not include the base members.

13. The meter assembly of claim 11, wherein the first split portion defines a first one of the plurality of light guides, and the second split portion defines a second one of the plurality of light guides.

14. The meter assembly of claim 11, wherein the first split portion and the second split portion are spaced apart to define a gap therebetween.

15. The meter assembly of claim 11, wherein the split points of neighboring ones of the plurality of light guides are spaced apart from the inner surface of the reflector case at different distances.

16. The meter assembly of claim 11, wherein at the inner surface of the reflector case neighboring ones of the plurality of light guides share opposite sides of the reflective wall, which at the split point spaced apart from the inner surface splits into the first split portion defining a first one of the plurality of light guides and the second split portion defining a second one of the plurality of light guides, the first split portion is spaced apart from the second split portion to define a gap therebetween.

17. The meter assembly of claim 11, wherein the first split portion and the second split portion are spaced apart from the main case.

* * * * *